P. F. WILLIAMS.
MULTIPLE POTHEAD.
APPLICATION FILED JUNE 1, 1908.
1,206,396.
Patented Nov. 28, 1916.
2 SHEETS—SHEET 1.
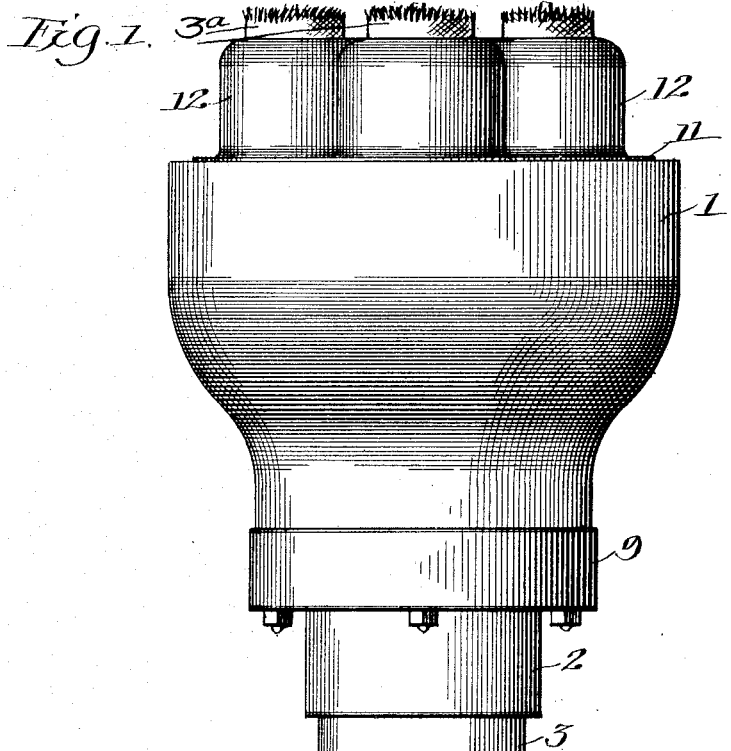
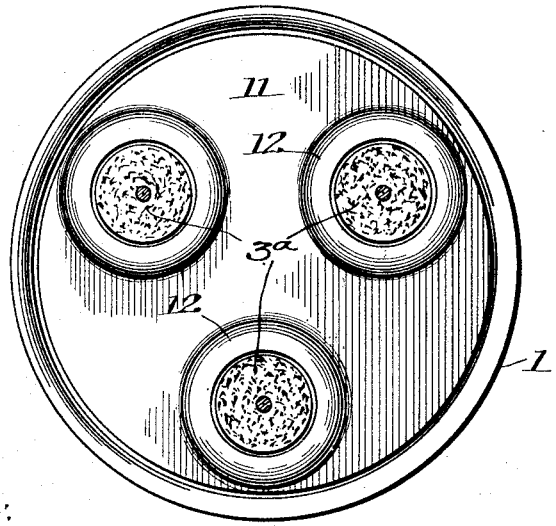
Witnesses:
Inventor
Paul F Williams
by
Atty P. F. WILLIAMS.
MULTIPLE POTHEAD.
APPLICATION FILED JUNE 1, 1908.
1,206,396.
Patented Nov. 28, 1916.
2 SHEETS—SHEET 2.
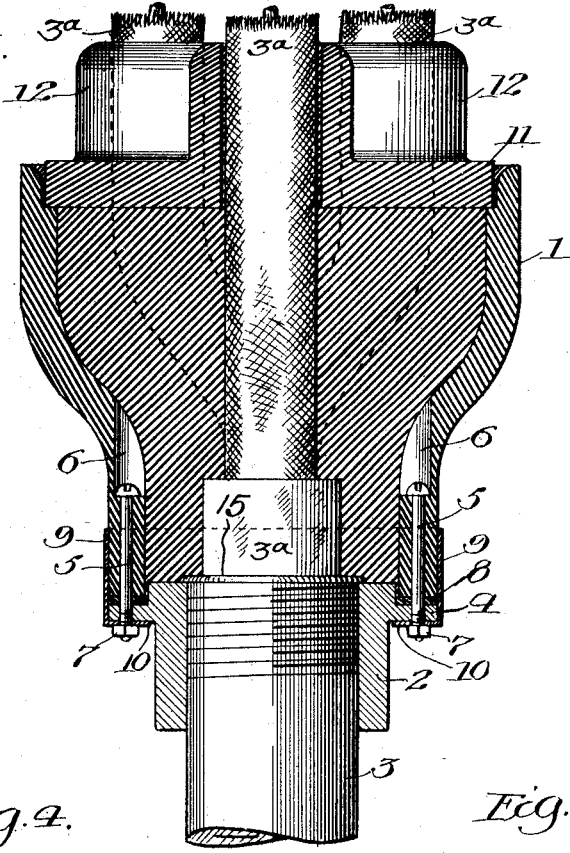
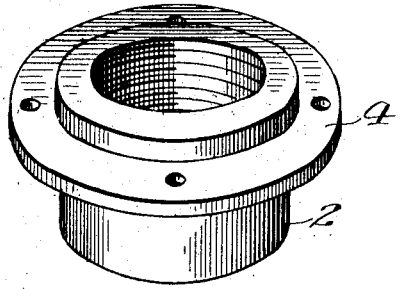
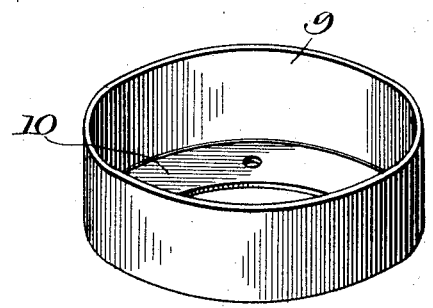
Witnesses
Inventor
Paul F. Williams

UNITED STATES PATENT OFFICE.

PAUL F. WILLIAMS, OF CHICAGO, ILLINOIS, ASSIGNOR TO G. & W. ELECTRIC SPECIALTY CO., OF CHICAGO, ILLINOIS, A CORPORATION OF ILLINOIS.

MULTIPLE POTHEAD.

1,206,396.     Specification of Letters Patent.     Patented Nov. 28, 1916.

Application filed June 1, 1908. Serial No. 435,940.

*To all whom it may concern:*

Be it known that I, PAUL F. WILLIAMS, citizen of the United States, residing at Chicago, in the county of Cook and State of Illinois, having invented a certain new and useful Improvement in Multiple Potheads, of which the following is a full, clear, concise, and exact description, reference being had to the accompanying drawings, forming a part of this specification.

My invention relates to pot heads for electric conductors, and especially to a multiple pot head adapted for a plurality of conductors, or a conductor, cable or the like, having a plurality of strands or parts.

The principal object of the invention is to provide a simple, practical and inexpensive form of conductor pot head especially adapted for interior purposes.

The pot head I show herein for carrying out my invention comprises a bowl, preferably made of insulating material such as porcelain, and having an aperture at the bottom provided with a suitable fitting for a cable or conductor. The bowl is provided with a top, or cover, having a plurality of outlets, and adapted to be secured in place to seal the bowl. The latter is filled with insulating material before the cover is put in place.

In the accompanying drawings Figure 1 is an elevation of a multiple pot head, embodying my present invention. Fig. 2 is a plan view of the same. Fig. 3 is a vertical section of the device. Figs. 4 and 5 are perspective views of details of construction.

The pot head shown in the drawings comprises a bowl, 1, open at its top and bottom. As a convenient arrangement the bottom is provided with a collar, 2, which is desirably made of metal, and is interiorly threaded, so that a cable, 3, can be screwed into said collar and held firmly in position therein. The collar 2 is conveniently constructed with a flange, 4, which fits below the lower edge of the bowl, and is held in position by screw bolts, 5, 5, passed through apertures 6, 6 in the bowl, and provided with nuts 7, 7. An insulating washer, or gasket, 8, preferably of rubber, is interposed between the flange 4 of the collar 2, and the lower edge of the bowl. A metal sheath, 9, is fitted upon the outside of the lower end of the bowl, 1, and has its lower edge, 10, bent in under the flange 4 of the collar 2, and held against said flange by the nuts 7, 7 on the bolts 5, 5.

A cover 11 is fitted to the open top of the bowl 1, and is provided with a plurality of outlets 12, 12, through which different strands or parts of a conductor cable can be passed. There are a plurality of these, three being shown in the drawings. The top is preferably sealed in place by some suitable sealing compound.

The conductor or cable, 3, is shown passed into the collar, 2, and screwed into the same, and then opened up and its several parts or strands, $3^a$, $3^a$, passed out through the openings or outlets, 12, 12. The bowl 1 is filled with insulating material; as for example, some form of compound, and the cover or top, 11, secured in place. The top of the cable sheath is bent or flanged over as at 15, Fig. 3.

It will be seen that this form of device is especially adapted for terminating a cable inside of a building or plant, the cable being opened up and its ends being covered and sealed, and led out for proper connection, which will be made outside of the pot head.

It will be understood that changes and modifications can be made without departing from the spirit of the invention.

What I claim is:

1. A device of the class specified, comprising a bowl made of insulating material and having its bottom provided with an aperture adapted to receive a cable sheath, and having a top which is provided with a plurality of apertures of a size to serve as outlets for the insulated strands of the cable, a cable having its outer sheath or covering arranged within the bottom aperture of the bowl and having said sheath removed from the portion of the cable within the bowl and having the outer insulation of the cable removed from a portion of said part of the cable within the bowl, said cable having its insulated strands extended out through the outlets in the top of the bowl, said outlets being formed by upwardly extending tubular projections formed integral with the cover and having bores substantially the size of the insulated cable strands, and insulating material in the interior of the bowl surrounding the insulated cable strands and the portion of the cable stripped of its outermost cover or sheath.

2. A pot head comprising a bowl, 1, having a contracted lower end provided with apertures, a collar, 2, located at the bottom of the bowl, and having a flange 4, adapted to fit the lower edge of the bowl, a rubber gasket, 8, between the flange, 4, and the lower edge of the bowl, a metallic sheath, 9, fitted upon the lower end portion of the bowl, and having its lower edge bent inwardly below the flange 4, threaded bolts, 5, 5, passed through said apertures in the lower portion of the bowl, 1, and engaging the flange 4 of the collar 2, and a loose cover or top, 11, fitted to the open top of the bowl.

3. A device of the class specified comprising a bowl having its bottom provided with an aperture adapted to receive a cable sheath, said aperture being of substantially the same size as the cable sheath, said bowl having a top provided with a plurality of apertures adapted to serve as outlets for strands of cable, said apertures being of substantially the same size as the cable strands, a cable extending through said aperture in the bottom of the bowl and having its sheath and parts of its insulation removed and its strands separated within the bowl and extended up through the outlet apertures in the top thereof, and insulating material substantially filling the interior of said bowl and sealing the cable end.

4. A device of the class specified, comprising a casing having an opening, a perforate plug for said opening and a metal tube or pipe passing through said opening and flanged at the inner edge of said plug, insulating compound within the casing sealing the joint between the flanged end of the tube or pipe and the perforated plug and insulated conductors extended through said metal tube or pipe and also through said insulating compound.

5. A device of the class specified, comprising a casing having an opening, a perforate plug for closing said opening, said plug having a shoulder adapted to fit against a rim of said opening, screw bolts extended through the casing wall and engaging said plug to hold the same in position and insulating compound arranged within the casing covering the inner ends of said bolts.

6. A device of the class specified, comprising a casing having an opening, a closure for said opening adapted to receive an insulated conductor, means for securing said closure to the casing and insulating compound sealing said securing means and said insulated conductor.

7. A device of the class specified comprising in combination a casing having an opening, a perforated plug for said opening, and a sheathed cable passing through said plug, the sheath of said cable being belled out over the inner edge of said plug, and insulating compound within the casing sealing the joint between the belled end of the cable sheath and the plug.

8. A cable pot-head, comprising in combination a tapered bowl having an inlet aperture at its lower end and provided with bolt sockets opening on the inside of said bowl, a perforated plug provided with a laterally projecting flange extending below the lower edge of said bowl, bolts having their heads in said sockets passing through said bowl and said flange, and a sheath attached to the lower face of said flange by said bolts and extending upwardly beyond the joint between said flange and the edge of said bowl.

9. A pot-head comprising a bowl having a contracted lower end provided with apertures, a collar located at the bottom of the bowl and having an outstanding flange adapted to fit the lower edge of the bowl, a metallic sheath fitted upon the lower end portion of the bowl and having its lower edge bent inwardly below said flange, and threaded bolts passed through said apertures in the lower part of the bowl and engaging said flange of the collar.

10. A device of the class specified comprising a bowl made of insulating material and having its bottom provided with an aperture adapted to receive a cable sheath, said aperture being of substantially the same size as the cable sheath, said bowl having a top provided with a plurality of apertures adapted to serve as outlets for strands of the cable, said apertures being of substantially the same size as the cable strands, a cable extending through said aperture in the bottom of the bowl and having its sheath and part of its insulation removed and its strands separated within the bowl and extended up through the outer apertures in the top thereof, and insulating material substantially filling the interior of the bowl and sealing the end of the cable and the cable strands therein.

11. A device of the class specified comprising a bowl made of insulating material and having its bottom provided with an aperture adapted to receive a cable sheath, said aperture being of substantially the same size as the cable sheath, said bowl having a top also made of insulating material and provided with a plurality of apertures adapted to serve as outlets for strands of the cable, said apertures being of substantially the same size as the cable strands, a cable extending through said aperture in the bottom of the bowl and having its sheath and part of its insulation removed and its strands separated within the bowl and extended up through the outer apertures in the top thereof, and insulating compound substantially filling the interior of the bowl and sealing the end of the cable and the cable strands therein.

12. A device of the class specified comprising a bowl having its bottom provided with an aperture adapted to receive a cable sheath, said aperture being provided with a removable closure and being of substantially the same size as the cable sheath, said bowl having a top provided with a plurality of apertures adapted to serve as outlets for strands of cable, said apertures being of substantially the same size as the cable strands, a cable extending through said aperture in the bottom of the bowl and having its sheath and part of its insulation removed, and its strands separated within the bowl and extended up through the outlet apertures in the top thereof, and insulating material substantially filling the interior of said bowl and sealing the cable end and said removable closure.

13. A device of the class specified, comprising a casing having an opening, a closure for said opening adapted to receive an insulated conductor, means for securing said closure to the casing, and insulating compound sealing said closure and said securing means and insulated conductor.

In witness whereof I hereunto subscribe my name this 27th day of May, A. D. 1908.

PAUL F. WILLIAMS.

Witnesses:
A. MILLER BELFIELD,
E. B. CAMPBELL.

Copies of this patent may be obtained for five cents each, by addressing the "Commissioner of Patents, Washington, D C."